United States Patent [19]

Fujikawa et al.

[11] Patent Number: 5,073,037
[45] Date of Patent: Dec. 17, 1991

[54] SPINDLE ASSEMBLY

[75] Inventors: Yoshio Fujikawa; Shizuka Yamazaki, both of Iwata, Japan

[73] Assignee: NTN Corporation, Osaka, Japan

[21] Appl. No.: 553,840

[22] Filed: Jul. 18, 1990

[30] Foreign Application Priority Data

Jan. 20, 1989 [JP] Japan ................................ 1-12875

[51] Int. Cl.⁵ ............................................. F16C 32/06
[52] U.S. Cl. ...................................... 384/120; 384/107
[58] Field of Search ............... 384/114, 118, 120, 111, 384/107

[56] References Cited

U.S. PATENT DOCUMENTS

| 3,395,952 | 8/1968 | Deffrenne | 384/118 |
| 3,454,311 | 7/1969 | Tomita et al. | 384/118 |
| 3,726,573 | 4/1973 | Unno | 384/120 |

Primary Examiner—Lenard A. Footland
Attorney, Agent, or Firm—Armstrong, Nikaido, Marmelstein, Kubovcik & Murray

[57] ABSTRACT

A spindle assembly having a spindle used as a rotary shaft or a machine tool or the like, at least one bearing sleeve for supporting the spindle as an externally pressurized gas bearing without touching it, a plurality of journal bearing clearances formed between the spindle and the bearing sleeve, and a housing accommodating the bearing sleeve. The bearing sleeve is formed with an annular groove for guiding compressed gas in a circumferential direction, at least three axially-extending gas supply grooves for directing the compressed gas through gas supply restrictor holes into the journal bearing clearances, and at least one axially-extending exhaust groove for discharging the compressed gas from said journal bearing clearances. The axial gas supply grooves and the exhaust groove have a plurality of gas supply restrictor holes and discharge holes, respectively.

7 Claims, 2 Drawing Sheets

SPINDLE ASSEMBLY

This invention relates to a spindle assembly in which a spindle is supported in a non-contact manner by externally pressurized gas bearings.

A prior art spindle assembly of this type is used in various kinds of machine tools, an arm of an industrial robot and the like. Because the spindle is kept out of contact with the bearing while in rotation, it can be rotated at high speed and is less likely to be stained with lubricating oil.

As shown in FIG. 5, a conventional spindle assembly 100 has two or more journal bearings as externally pressurized gas bearings to support radial and moment loads. In the example of FIG. 5, four bearing sleeves 20' are mounted on the spindle 20 in a housing 30 as journal bearings to support the spindle. Compressed gas fed through an inlet 110 is divided into four gas flows 111-114 and supplied to the portions shown. The gas flow 113 is supplied through a passage 50, an annular groove 70 and a restrictor hole 71 into a clearance 80 formed between the bearing sleeves 20' and the spindle 20. Then the gas from both ends of each sleeve is discharged through an exhaust port 90 or through both ends of the spindle 20. Numeral 40 designates a cylindrical portion of the housing, 120 is an annular groove for the gas flow 114, 130 is a spindle flange, and 140 is a bolt for securing a driving-side housing 30'' to the main housing 30. The spindle flange 130 is supported by an externally pressurized gas bearing formed by the supply pressures of the opposite gas flows 112 and 114. The supply passage 50 and the exhaust port 90 are usually formed by machining such as drilling.

In order to achieve precise and high-speed positioning with such a prior art spindle assembly mounted e.g. on a carriage of a machine tool or the like, the spindle is required to be as compact and lightweight as possible.

But in order to achieve excellent properties as a bearing by minimizing the pressure loss in the passage from the inlet port 110 to the restrictor holes 71, the passage for the gas supplied from a compressed gas source has to have a sufficiently large sectional area. This is because it is necessary to supply externally pressurized gas through the restrictor holes 71 in a predetermined amount and at a predetermined pressure.

With the air supply passage arrangement shown in FIG. 5, the gas supply passage 50 in the housing 30 has to have a sectional area larger than a predetermined value. This leads to an increase in the wall thickness of the housing 30 at the journal bearing portion, thus making it difficult to reduce the size and weight of the assembly.

Further, with the above-described gas supply/exhaust structure, foreign substances and slugs can easily invade into the assembly especially through the exhaust holes 90. This might cause the seizure of the bearing. This is because it is necessary to provide a considerable number of circumferentially arranged exhaust holes to allow the gas to be discharged at a pressure substantially equal to the atmospheric pressure.

It is an object of this invention to provide a spindle assembly comprising externally pressurized gas bearings and a spindle which obviates the abovesaid shortcomings and which is compact in size with reduced diameter of the housing.

According to this invention, the compressed gas supplied through the gas inlet port is divided into at least three axially-extending gas supply grooves and blown into the journal bearing clearances through a plurality of gas supply restrictor holes. The journal bearing clearances are formed between the bearing sleeve and the spindle. The spindle is supported out of contact with the bearing sleeve during rotation by the action of the compressed gas fed into these gaps Thus the frictional loss between metals can be limited to a minimum.

The gas fed into the journal bearing clearances flows toward the exhaust holes and is collected into the axially-extending exhaust grooves. It is then discharged along the axis of the spindle. This prevents any foreign substances from entering the assembly through the exhaust ports.

The above-described gas supply/exhaust arrangement makes it possible to form axial grooves having a substantially rectangular section and to increase the sectional area of the supply and exhaust passages. Further, because these supply and exhaust passages are formed not in the housing as with any prior art arrangement but in the bearing sleeve itself., the sectional area of the housing can be reduced, too. This in turn serves to reduce the weight of the entire spindle assembly.

The main housing at the lefthand side of the annular groove can have a reduced wall thickness so long as it can seal the gas supply or exhaust grooves. Thus the spindle assembly according to this invention is compact and lightweight and still retains excellent properties as a bearing.

Further, because the bearing sleeve is an integral member, the assembly can be manufactured and assembled in a shorter time and at lower cost.

Other features and objects of the present invention will become apparent from the following description taken with reference to the accompanying drawings, in which.

The preferred embodiments of this invention are now described with reference to the accompanying drawings.

Figure 1:
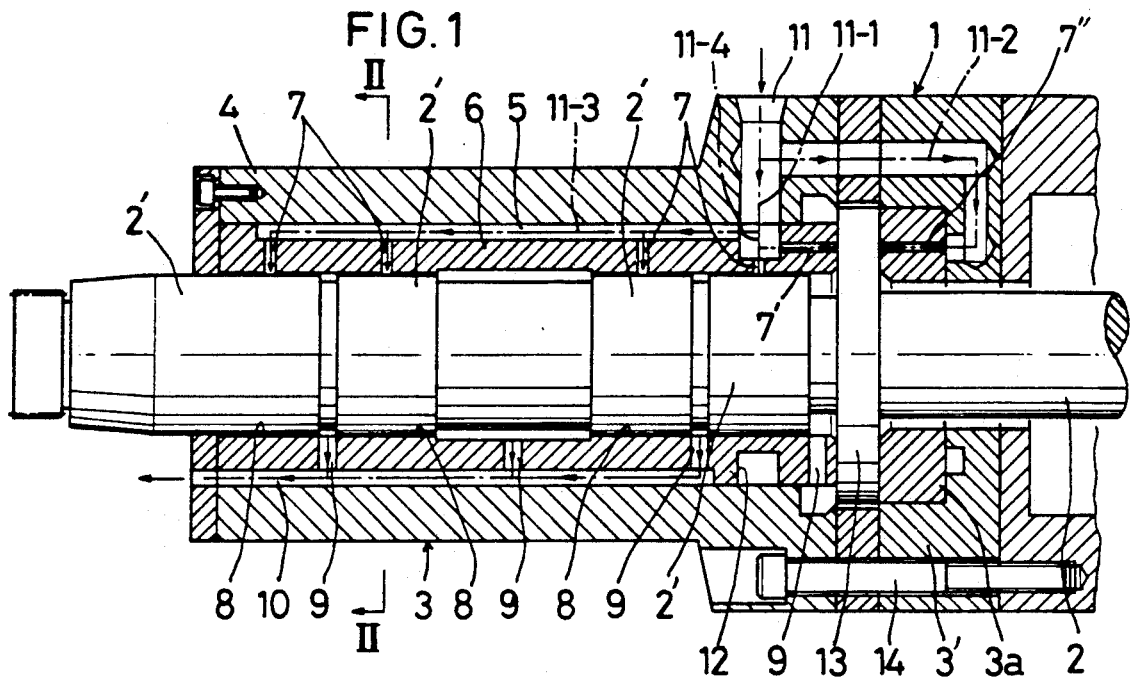
FIG. 1 is a vertical sectional view of the first embodiment of spindle assembly according to this invention.

Referring first to FIG. 1, a spindle assembly 1 has a spindle 2 used as a rotary shaft of a machine tool or the like extending through and supported in a housing 3. The spindle 2 extends through a bearing sleeve 6 mounted in a main housing 4 of the housing 3. The bearing sleeve 6 is formed in its outer peripheral surface with axially-extending gas supply grooves 5 and exhaust grooves 10. Numeral 11 designates a gas inlet port.

Figure 2:
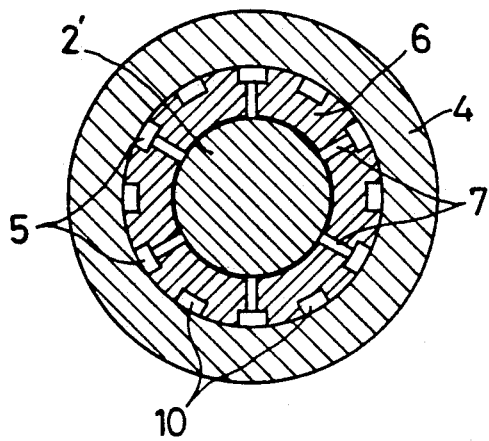
FIG. 2 is a sectional view taken along line II—II of FIG. 1.

FIG. 2 is a sectional view taken along line II—II of FIG. 1, which shows that the bearing sleeve 6 and large-diameter portions 2' of the spindle 2 are mounted in the main housing 4.

Figure 3:
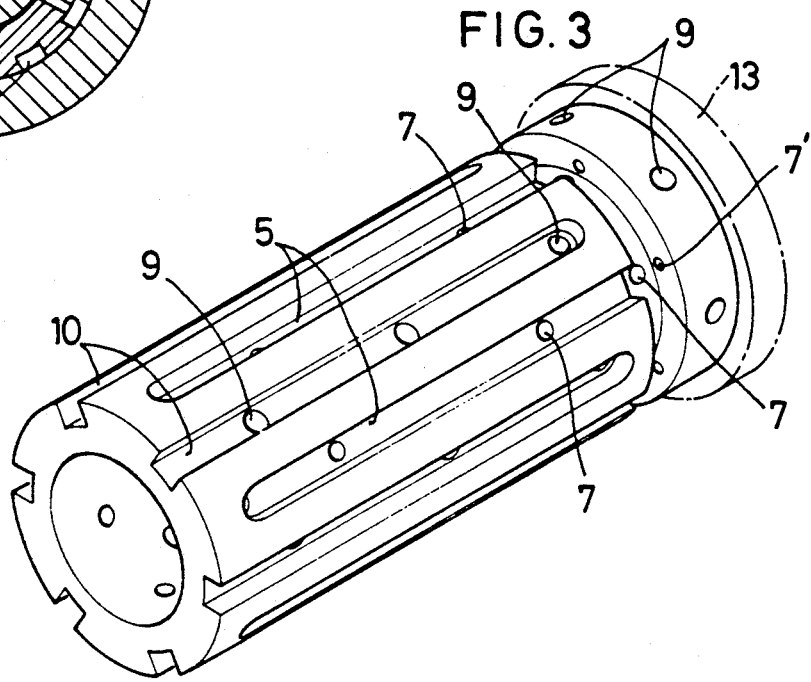
FIG. 3 is an enlarged perspective view of the bearing sleeve.

FIG. 3 is an enlarged perspective view of the bearing sleeve 6 shown in FIGS. 1 and 2. A plurality of the axially-extending air supply grooves 5 and exhaust grooves 10 are formed alternately in the outer periphery thereof. Each of these grooves 5 and 10 has a predetermined number (four in the example shown) of gas supply holes 7 or exhaust holes 9. As shown in FIG. 1, compressed gas is fed through the gas supply restrictor holes 7 into journal bearing clearances 8, that is, narrow gaps defined between the bearing sleeve 6 and the large-diameter portions of the spindle 2. This arrangement serves as externally pressurized bearings. A plurality of such journal bearing clearances 8 are normally provided at suitable locations, according to the length of the spindle.

In this embodiment, the bearing sleeve 6 is formed near its righthand end with an annular groove 12 for guiding the compressed gas fed from the compressed gas supply source in the circumferential direction. It serves to uniformly distribute the compressed gas to each of the axially extending gas supply grooves 5. The gas supply restrictor holes may be inherent, orifice, capillary or porous ones.

Compressed gas is supplied through the axial gas supply grooves 5 and the gas supply restrictor holes 7 into the journal bearing clearances 8 and discharged through the exhaust holes 9 and the axial exhaust grooves 10.

A flange 13 is provided in contact with the righthand end of the bearing sleeve 6. It is fixed to the spindle 2 to support the thrust of the spindle 2.

For the thrust-support by the flange 13, a coupler 3' containing a thrust-support member 3a is secured to the main housing 4 by bolts 14. As shown in FIG. 1, the coupler 3' is formed therein with a gas supply passage for guiding compressed gas toward the righthand side of the flange 13 so that the gas supply restrictor holes 7' at the lefthand side of the flange 13 and gas supply restrictor holes 7" formed in the thrust-support member 3a serve for externally pressurized gas bearings in the thrust direction.

Next, the operation of this embodiment is described.

Compressed gas supplied through the inlet port 11 branches into flows 11-1, 11-2, 11-3 and 11-4, which then lead to the respective gas supply restrictor holes 7, 7' and 7". Because the axial gas supply grooves 5 are formed in the outer peripheral surface of the bearing sleeve 6, there is no need for forming a gas supply passage in the main housing 4 provided outside the bearing sleeve 6. This makes it possible to reduce the sectional area of the main housing 4 and thus to reduce the size and weight of the spindle assembly.

As has already been described, by supplying compressed air through the gas supply restrictor holes 7 in the bearing sleeve 6, the spindle 2 is rotated out of contact with the bearing sleeve 6. The compressed gas is discharged through the axial exhaust grooves 10.

Figure 4:
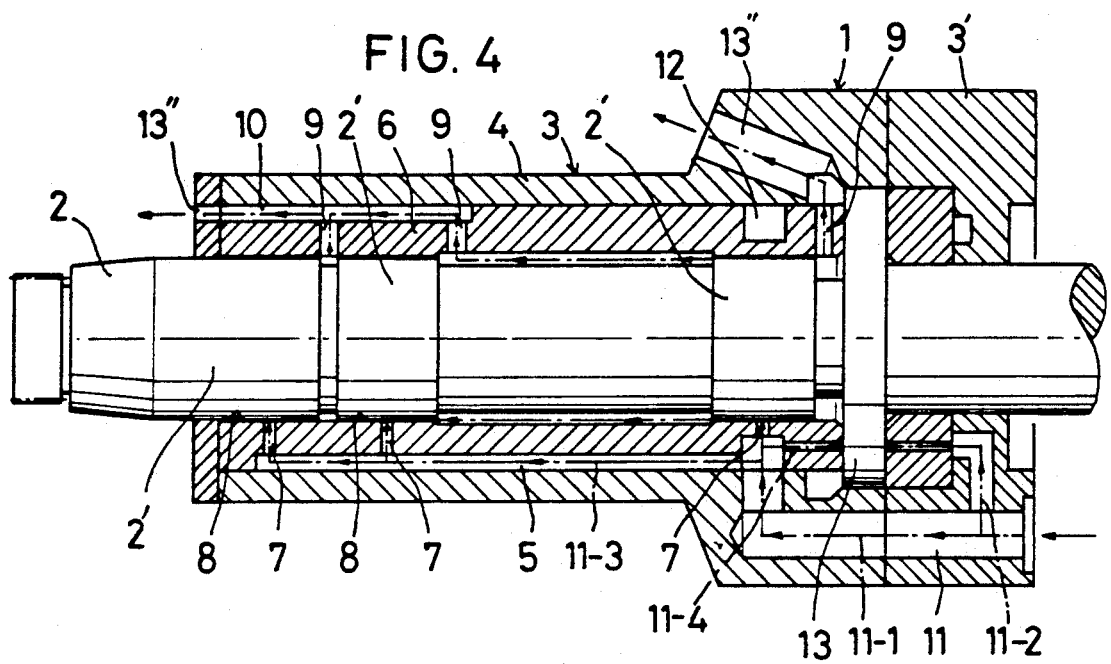
FIG. 4 is a vertical sectional view of the second embodiment.
Figure 5:
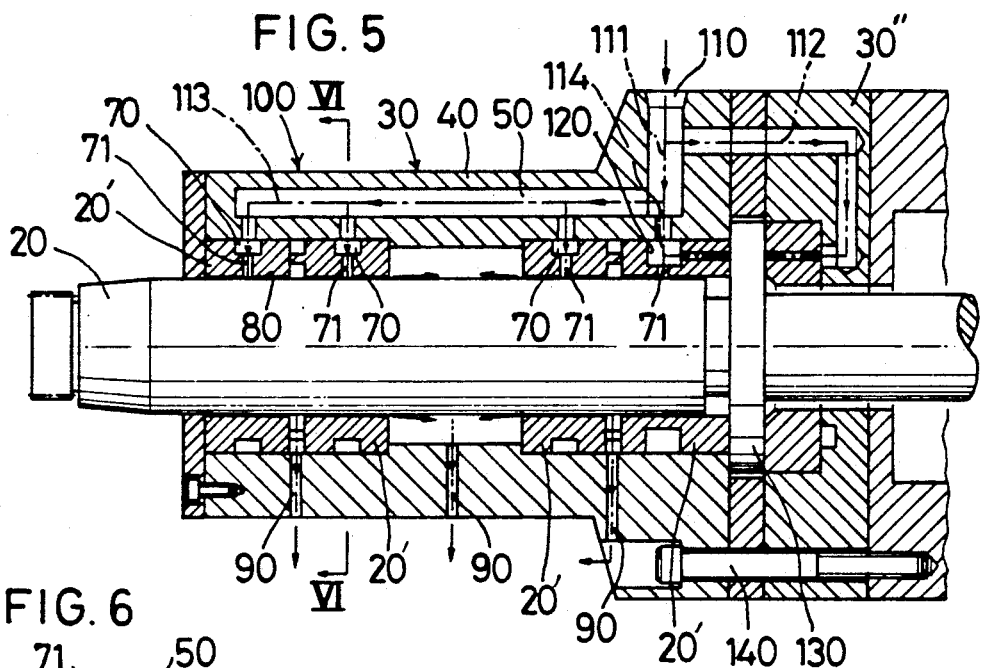
FIG. 5 is a vertical sectional view of a prior art spindle.
Figure 6:
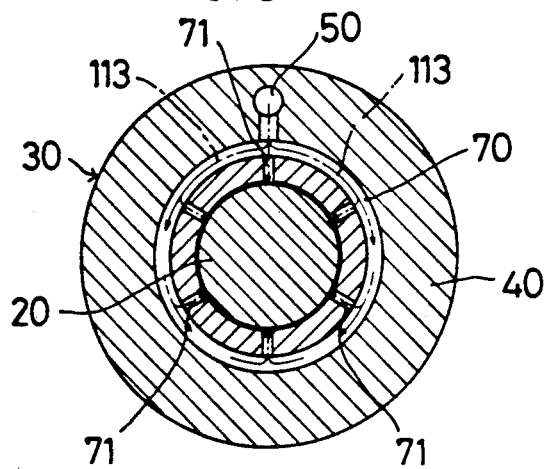
FIG. 6 is a sectional view taken along line VI—VI of FIG. 5.

FIG. 4 is a vertical sectional view of another embodiment which slightly differs in structure from the first embodiment. This embodiment differs from the first embodiment in that the inlet port 11 for compressed gas is provided parallel to the spindle, that the righthand end of the large-diameter portion 2' of the spindle is more or less kept apart, so that the axial gas supply grooves 5 are a little longer than in the first embodiment, and that two exhaust ports 13" are provided independently of each other, one formed in the left portion and the other formed in the upper right portion. But its function is substantially the same as the first embodiment.

What is claimed is:

1. A spindle assembly comprising:
    a spindle;
    at least one bearing sleeve means for supporting said spindle as an externally pressurized gas bearing without touching said spindle; and
    a housing means for accommodating said bearing sleeve means, said bearing sleeve means being formed with at least three axially-extending gas supply grooves communicating with a clearance formed between said spindle and said bearing sleeve means to feed compressed gas thereinto and an axially-extending exhaust groove communicating with said clearance to discharge said compressed gas therefrom, and said gas supply grooves being formed on an outer peripheral surface of said bearing sleeve means and longitudinally along a length thereof.

2. A spindle assembly as claimed in claim 1, wherein said bearing sleeve means is further formed with an annular groove communicating with said gas supply grooves to guide compressed gas supplied from a source of compressed gas into said gas supply grooves, said gas supply grooves and said gas exhaust grooves communicating with said clearance formed between said spindle and said bearing sleeve means through a plurality of restrictor holes and a plurality of exhaust holes, respectively.

3. A spindle assembly as claimed in claim 2, wherein said axial gas supply grooves and said axial exhaust grooves are arranged alternately with each other and said annular groove is formed at one end of said bearing sleeve.

4. A spindle assembly as claimed in claim 2, wherein said exhaust holes include outlet ports, one outlet port extending along one end portion of said spindle assembly and another outlet port extending along another end opposite said one end portion of said spindle assembly.

5. A spindle assembly as claimed in claim 2, wherein said exhaust holes include an outlet port extending along one end portion of said spindle assembly.

6. A spindle assembly as claimed in claim 1, wherein said gas supply grooves include an inlet port having an axis which is parallel to an axis of said spindle.

7. A spindle assembly as claimed in claim 1, wherein said gas supply grooves include an inlet port having an axis which is perpendicular to an axis of said spindle.

* * * * *